(12) United States Patent
Liu et al.

(10) Patent No.: US 11,698,543 B2
(45) Date of Patent: Jul. 11, 2023

(54) DIMMING METHOD AND DIMMING DEVICE FOR DIMMING GLASS, AND DIMMING GLASS SYSTEM

(71) Applicants: Beijing BOE Sensor Technology Co., Ltd., Beijing (CN); BOE Technology Group Co., Ltd., Beijing (CN)

(72) Inventors: Guo Liu, Beijing (CN); Chen Meng, Beijing (CN); Zhong Hu, Beijing (CN); Jiarong Liu, Beijing (CN); Qinhao Piao, Beijing (CN); Yutao Tang, Beijing (CN); Xiantao Liu, Beijing (CN); Binbin Liu, Beijing (CN)

(73) Assignees: Beijing BOE Sensor Technology Co., Ltd., Beijing (CN); BOE Technology Group Co., Ltd., Beijing (CN)

( * ) Notice: Subject to any disclaimer, the term of this patent is extended or adjusted under 35 U.S.C. 154(b) by 237 days.

(21) Appl. No.: 17/182,191

(22) Filed: Feb. 22, 2021

(65) Prior Publication Data
US 2021/0318559 A1 Oct. 14, 2021

(30) Foreign Application Priority Data
Apr. 10, 2020 (CN) .......................... 202010280603.7

(51) Int. Cl.
*G02F 1/01* (2006.01)

(52) U.S. Cl.
CPC ................................. *G02F 1/0121* (2013.01)

(58) Field of Classification Search
CPC ...................................................... G02F 1/0121
See application file for complete search history.

(56) References Cited

FOREIGN PATENT DOCUMENTS

| CN | 105050297 | * | 11/2015 | ............. | H05B 37/02 |
| CN | 111624577 | * | 9/2020 | ............. | G01S 7/497 |

* cited by examiner

*Primary Examiner* — Sang V Nguyen
(74) *Attorney, Agent, or Firm* — Arch & Lake LLP

(57) ABSTRACT

The present disclosure discloses a dimming method for a dimming glass, including: in response to a dimming level selected from a user, obtaining a light transmittance value corresponding to the selected dimming level according to a corresponding relationship between dimming levels and actual light transmittance of the dimming glass; obtaining a dimming voltage value corresponding to the light transmittance value according to a corresponding relationship between the actual light transmittance and dimming voltages of the dimming glass; and adjusting a voltage applied to the dimming glass to the obtained dimming voltage value, wherein the corresponding relationship between the dimming levels and the actual light transmittance of the dimming glass is dividing an adjustable range of the actual light transmittance of the dimming glass to obtain the actual light transmittance corresponding to different dimming levels. The present disclosure improves dimming effect of dimming glass.

13 Claims, 9 Drawing Sheets

| Dimming level | 1 | 2 | 3 | 4 | 5 | 6 | 7 | 8 | 9 | 10 | 11 |
|---|---|---|---|---|---|---|---|---|---|---|---|
| Voltage for prior art | 0 | 3 | 6 | 9 | 12 | 15 | 18 | 21 | 24 | 27 | 30 |
| Voltage for equally divided transmittance | 0 | 6.8 | 7.8 | 8.4 | 9 | 9.4 | 10 | 10.4 | 11 | 11.8 | 30 |
| Voltage for Gamma curve | 0 | 7.8 | 8.8 | 9.4 | 10.4 | 11 | 11.6 | 12.2 | 13.2 | 15.2 | 30 |

DIMMING METHOD AND DIMMING DEVICE FOR DIMMING GLASS, AND DIMMING GLASS SYSTEM

CROSS-REFERENCE TO RELATED APPLICATIONS

This application is based on and claims priority to Chinese patent application No. 202010280603.7 filed on Apr. 10, 2020. The entire content of which is hereby incorporated by reference for all purposes.

TECHNICAL FIELD

The present disclosure relates to the field of display technologies, and more specifically, to a dimming method and dimming device for a dimming glass, and a dimming glass system.

BACKGROUND

With the progress of science and technology, high-tech display technologies have been applied to various fields, particularly, the display technologies are increasingly utilized by people in automotive industry, construction industry and aircraft industry.

At present, dimming glasses are often used as windows in houses, motor vehicles or aircrafts, and can change light transmittance thereof by adjusting an input voltage.

In prior art, dimming levels of the dimming glass are often linearly corresponding to dimming voltages. For example, the dimming glass is set as having 11 dimming levels, and the dimming voltages of the dimming glass are set from 0V to 30V with a step length of 3V to be corresponding to the 11 dimming levels respectively. At this time, the light transmittance corresponding to the 11 dimming levels respectively is shown in FIG. 1. In FIG. 1, human eyes can barely distinguish four dimming levels, which usually cannot achieve good dimming effect.

SUMMARY

In order to solve the technical problem raised in the background technology, a first aspect of the present disclosure proposes a dimming method for a dimming glass, comprising:

in response to a dimming level selected from a user, obtaining a light transmittance value corresponding to the selected dimming level according to a corresponding relationship between dimming levels and actual light transmittance of the dimming glass;

obtaining a dimming voltage value corresponding to the light transmittance value according to a corresponding relationship between the actual light transmittance and dimming voltages of the dimming glass; and adjusting a voltage applied to the dimming glass to the obtained dimming voltage value, wherein the corresponding relationship between the dimming levels and the actual light transmittance of the dimming glass is dividing an adjustable range of the actual light transmittance of the dimming glass to obtain the actual light transmittance corresponding to different dimming levels.

Optionally, dividing the adjustable range of the actual light transmittance of the dimming glass to obtain the actual light transmittance corresponding to different dimming levels comprises:

obtaining the adjustable range of the actual light transmittance of the dimming glass; and dividing the adjustable range of the actual light transmittance of the dimming glass equally to obtain the actual light transmittance corresponding to the different dimming levels.

Optionally, dividing the adjustable range of the actual light transmittance of the dimming glass to obtain the actual light transmittance corresponding to different dimming levels comprises:

obtaining the adjustable range of the actual light transmittance of the dimming glass;

obtaining an adjustable range of human eye-sensed light transmittance corresponding to the adjustable range of the actual light transmittance of the dimming glass, according to a corresponding relationship between the actual light transmittance of the dimming glass and the human eye-sensed light transmittance;

dividing the adjustable range of the human eye-sensed light transmittance equally to obtain the human eye-sensed light transmittance corresponding to different dimming levels; and obtaining the actual light transmittance corresponding to the different dimming levels according to the human eye-sensed light transmittance corresponding to the different dimming levels.

Optionally, the corresponding relationship between the actual light transmittance of the dimming glass and the human eye-sensed light transmittance is obtained by the following equation:

$$T_{sense} = T_{real}^{\left(\frac{1}{gamma}\right)};$$

wherein $T_{sense}$ is the human eye-sensed light transmittance, $T_{real}$ is the actual light transmittance of the dimming glass, and gamma is a gamma value.

Optionally, the gamma value is 2.2.

Optionally, obtaining the dimming voltage value corresponding to the light transmittance value according to the corresponding relationship between the actual light transmittance and the dimming voltages of the dimming glass comprises:

obtaining an ambient temperature at which the dimming glass is exposed; and obtaining the dimming voltage value corresponding to the dimming rate value, according to a corresponding relationship between the actual light transmittance and the dimming voltages of the dimming glass at the ambient temperature.

A second aspect of the present disclosure proposes a dimming device for a dimming glass, comprising:

a memory, configured to store a corresponding relationship between dimming levels and actual light transmittance of the dimming glass and a corresponding relationship between the actual light transmittance and dimming voltages of the dimming glass;

a user interaction module; and a processor, configured to, in response to a dimming level selected from a user in the user interaction module, obtain a light transmittance value corresponding to the selected dimming level according to the corresponding relationship between the dimming levels and the actual light transmittance of the dimming glass, and obtain a dimming voltage value corresponding to the light transmittance value according to the corresponding relationship between the actual light transmittance and the dimming voltage of the dimming glass, so as to adjust a voltage applied to the dimming glass to the obtained dimming voltage value, wherein the corresponding relationship between the dimming levels and the actual light transmittance is dividing an adjustable range of the actual light transmittance of the dimming glass to obtain the actual light transmittance corresponding to different dimming levels.

Optionally, further comprising:

a temperature sensor, configured to sense an ambient temperature at which the dimming glass is exposed, wherein the memory is further configured to store a corresponding relationship between the actual light transmittance and the dimming voltages of the dimming glass at different ambient temperatures; and the processor is further configured to obtain the dimming voltage value corresponding to the light transmittance value according to the stored corresponding relationship between the actual light transmittance and the dimming voltages of the dimming glass at the ambient temperature, so as to adjust a voltage applied to the dimming glass to the obtained dimming voltage value.

Optionally, the user interaction module comprises:

a user interaction interface and a feedback module, wherein the user interaction interface is configured to receive a selection of a dimming level from a user, and the feedback module is configured to send the dimming level selected from the user to the processor.

Optionally, the user interaction interface comprises:

a dimming level input box, configured to obtain the dimming level in response to a number entered from the user in the dimming level input box; or a plurality of separate dimming level buttons, configured to obtain the dimming level in response to clicks on the dimming level buttons from the user.

Optionally, the user interaction interface comprises a dimming level progress bar, configured to obtain the dimming level in response to dragging or dropping of the dimming level progress bar from the user.

Optionally, the processor and the temperature sensor are integrated on a circuit board.

A third aspect of the present disclosure proposes a dimming glass system, comprising:

a dimming glass; and the dimming device proposed in the second aspect of the present disclosure.

The beneficial effects of the present disclosure are as follows:

The technical solutions of the present disclosure have the advantages of clear principle and simple design. In the specific implementations of the embodiment, the dimming levels of the dimming glass depend mainly on the actual light transmittance of the dimming glass. Thus, at first, it is necessary to obtain the adjustable range of the actual light transmittance corresponding to the dimming glass, and then the adjustable range of the actual light transmittance of the dimming glass is divided so as to obtain the actual light transmittance corresponding to different dimming levels. Here, since the dimming level is obtained based on the actual light transmittance of the dimming glass, the adjustable range of the actual light transmittance of the dimming glass can be divided according to the degree to which the light transmittance of the dimming glass can be differentiated by human eyes, such that human eyes can differentiate more dimming levels, thus improving dimming effect.

BRIEF DESCRIPTION OF THE DRAWINGS

A brief introduction will be made below to the accompanying drawings required for the description of embodiments, for clearer illustration of technical solutions in embodiments of the present disclosure. Apparently, the drawings in the following description are only some embodiments of the present disclosure, and based on the drawings those of ordinary skill in the art can also derive other drawings without doing any creative work.

FIG. 6 shows a diagram of corresponding relationships between dimming levels and dimming voltages, of the two implementations of the embodiment and of prior art;

DETAILED DESCRIPTION

Hereinafter, embodiments of the present disclosure will be further described in detail in conjunction with the accompanying drawings, in order to make technical solutions and advantages of the present disclosure clearer.

Figure 2:
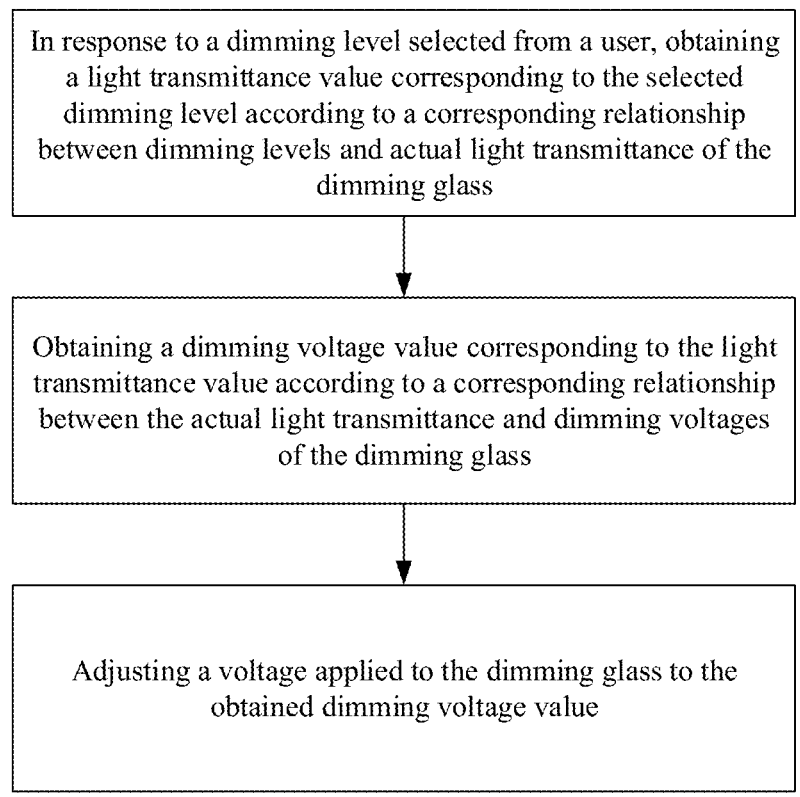
FIG. 2 shows a flow chart of steps of a dimming method for a dimming glass proposed in an embodiment of the present disclosure.

FIG. 2 shows a flow chart of steps of a dimming method for a dimming glass proposed in an embodiment of the present disclosure. The dimming method can be applied to a dimming glass installed in such as houses, motor vehicles or aircrafts, mainly for performing corresponding adjustment of light transmittance of the dimming glass.

As shown in FIG. 2, the dimming method includes the following steps:

In step S100, in response to a dimming level selected from a user, a light transmittance value corresponding to the selected dimming level is obtained according to a corresponding relationship between dimming levels and actual light transmittance of the dimming glass;

In step S200, according to a corresponding relationship between actual light transmittance and dimming voltages of the dimming glass, a dimming voltage value corresponding to the light transmittance value is obtained.

In step S300, a voltage applied to the dimming glass is adjusted to the obtained dimming voltage value.

Specifically, in step S100, firstly, in response to the dimming level specifically selected from the user, the light transmittance value corresponding to the selected dimming level is obtained according to the corresponding relationship between the dimming level selected from the user and the actual light transmittance of the dimming glass. For example, the user selects a dimming level of 3, and then a light transmittance value corresponding to the dimming level of 3 is obtained.

In this embodiment, the corresponding relationship between the dimming levels and the actual light transmittance of the dimming glass is as follows:

an adjustable range of the actual light transmittance of the dimming glass is divided, to obtain the actual light transmittance corresponding to different dimming levels.

Figure 1:
FIG. 1 shows an effect diagram of light transmittance respectively corresponding to a plurality of dimming levels in prior art.

In prior art, the dimming levels of the dimming glass are often linearly corresponding to the dimming voltages. For example, the dimming glass is set as having 11 dimming levels, and the dimming voltages of the dimming glass are set from 0V to 30V with a step length of 3V to be corresponding to the 11 dimming levels respectively. At this time, the actual light transmittance respectively corresponding to the 11 dimming levels is shown in FIG. 1. In FIG. 1, human eyes can barely distinguish four dimming levels. According to the graph of the corresponding relationship between the dimming voltages and the actual light transmittance of the dimming glass at −30° C. in a laboratory shown in FIG. 3, it can be known, at a certain temperature, the dimming voltages and the actual light transmittance of the dimming glass are not linearly related, so the span of the actual light transmittance between adjacent dimming levels in prior art is very uneven, and often cannot achieve good dimming effect.

The dimming level of the dimming glass in this embodiment depends mainly on the actual light transmittance of the dimming glass. At first, it obtains an adjustable range of the actual light transmittance corresponding to the dimming glass, and then the adjustable range of the actual light transmittance of the dimming glass is divided so as to obtain the actual light transmittance corresponding to different dimming levels. Here, since the dimming levels are obtained based on the actual light transmittance of the dimming glass, the adjustable range of the actual light transmittance of the dimming glass can be divided according to the degree to which the light transmittance of the dimming glass can be differentiated by human eyes, to obtain the dimming levels, so that human eyes can differentiate more dimming levels, thus improving dimming effect and user satisfaction.

Figure 3:
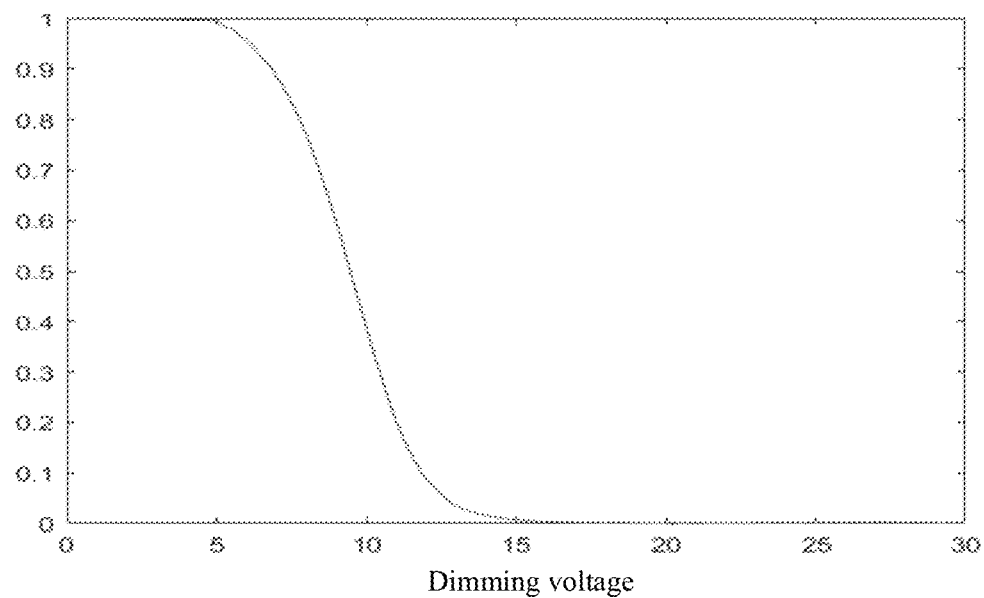
FIG. 3 shows a graph of a corresponding relationship between dimming voltages and actual light transmittance of a dimming glass at −30° C. in a laboratory.

Further, in step S200, the actual light transmittance of the dimming glass varies since different dimming voltages applied to the dimming glass. Based on this, the purpose of adjusting the actual light transmittance of the dimming glass can be achieved by adjusting the applied dimming voltage. In this embodiment, a dimming voltage value corresponding to each of the dimming levels is obtained according to the corresponding relationship between the actual light transmittance and the dimming voltages of the dimming glass. It should be noted that the corresponding relationship between the actual light transmittance and the dimming voltages of the dimming glass is prior art. For example, the corresponding relationship between the actual light transmittance and the dimming voltages of the dimming glass in this embodiment can be the graph of the corresponding relationship between the dimming voltages and the actual light transmittance of the dimming glass at minus 30° C. in a laboratory as shown in FIG. 3.

In step S300, the purpose of adjusting the actual light transmittance of the dimming glass may be achieved by adjusting the voltage applied to the dimming glass to the dimming voltage value corresponding to the dimming level selected from the user.

In an optional implementation of this embodiment, dividing the adjustable range of the actual light transmittance of the dimming glass to obtain the actual light transmittance corresponding to the different dimming levels includes:

obtaining the adjustable range of the actual light transmittance of the dimming glass; and dividing the adjustable range of the actual light transmittance of the dimming glass equally to obtain the actual light transmittance corresponding to the different dimming levels.

Figure 4:
FIG. 4 shows an effect diagram of light transmittance respectively corresponding to a plurality of dimming levels in the embodiment.

It should be noted that in this embodiment, due to that the dimming glass is made of different materials, adjustable ranges of actual light transmittance of dimming glasses are also different. Therefore, it is necessary to obtain the adjustable range of the actual light transmittance of each dimming glass, and divide the adjustable range of the actual light transmittance equally, so as to obtain the actual light transmittance corresponding to different dimming levels, to make the spans of the actual light transmittance between adjacent dimming levels are the same, such that human eyes can distinguish more dimming levels, thus improving dimming effect. FIG. 4 shows an effect diagram of light transmittance respectively corresponding to a plurality of dimming levels in this embodiment.

In another optional implementation of this embodiment, since the sensitivity of human eyes to light intensity is different, and taking an 8 bit image as an example, the sensitivity of human eyes to an interface of gray levels 0-1 and an interface of gray levels 254-255 is different, so the ability of human eyes to distinguish a boundary of gray levels 0-1 and a boundary of gray levels 254-255 is different. In order to further improve the differentiation of the dimming levels by human eyes, as another implementation of this embodiment, the actual light transmittance corresponding to the dimming levels of the dimming glass can be further correspondingly set according to the human eye-sensed light transmittance.

Specifically, dividing the adjustable range of the light transmittance of the dimming glass equally to obtain the actual light transmittance corresponding to the different dimming levels includes:

obtaining the adjustable range of the actual light transmittance of the dimming glass;

obtaining an adjustable range of the human eye-sensed light transmittance corresponding to the adjustable range of the actual light transmittance of the dimming glass, according to a corresponding relationship between the actual light transmittance of the dimming glass and the human eye-sensed light transmittance;

dividing the adjustable range of the human eye-sensed light transmittance equally to obtain the human eye-sensed light transmittance corresponding to different dimming levels; and obtaining the actual light transmittance corresponding to the different dimming levels according to the human eye-sensed light transmittance corresponding to the different dimming levels.

Figure 5:
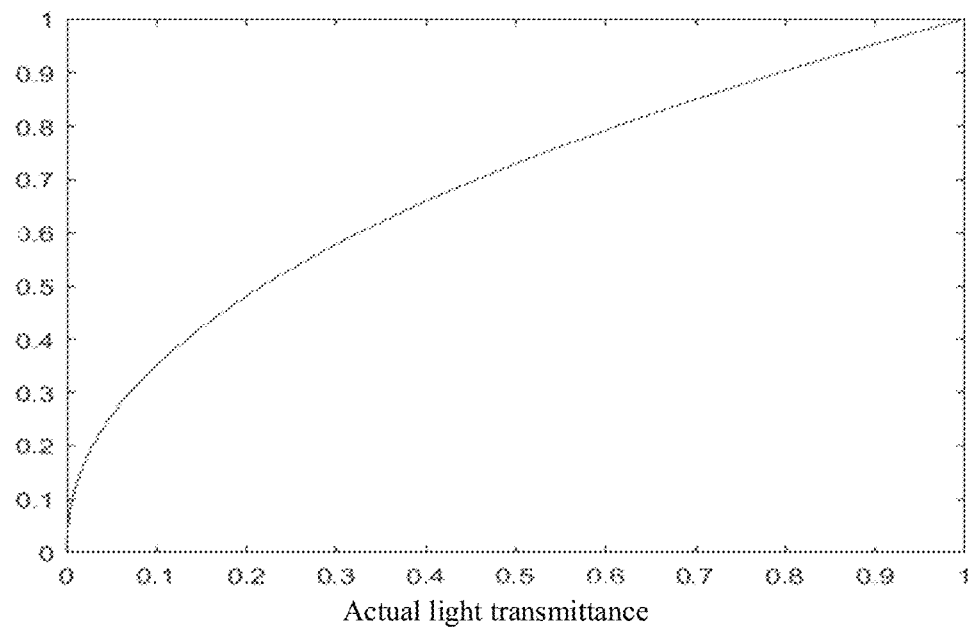
FIG. 5 shows a graph of a corresponding relationship between actual light transmittance of a dimming glass and human eye-sensed light transmittance in the embodiment.

In the embodiment, the graph of the corresponding relationship between the actual light transmittance of the dimming glass and the human eye-sensed light transmittance is as shown in FIG. 5. The graph can be obtained by the following equation:

$$T_{sense} = T_{real}^{\left(\frac{1}{gamma}\right)};$$

wherein $T_{sense}$ is the human eye-sensed light transmittance, $T_{real}$ is the actual light transmittance of the dimming glass, and gamma is a gamma value. Here, the gamma value is such as 2.2.

In the specific implementation of this embodiment, firstly, the adjustable range of the human eye-sensed light transmittance corresponding to the adjustable range of the actual light transmittance of the dimming glass can be obtained based on the above-described corresponding relationship between the actual light transmittance of the dimming glass and the human eye-sensed light transmittance. Next, the adjustable range of the human eye-sensed light transmittance is equally divided to obtain the human eye-sensed light transmittance corresponding to different dimming levels. Then, actual light transmittance corresponding to different dimming levels is obtained according to the human eye-sensed light transmittance corresponding to the different dimming levels. Thus, based on the sensitivity of human eyes to the light transmittance, the spans of the human eye-sensed light transmittance corresponding to adjacent dimming levels are set to be the same, such that human eyes can distinguish more dimming levels, thus further improving dimming effect.

Further, assuming that the number of the dimming levels of the dimming glass is set to be 11, the actual light transmittance corresponding to the 11 dimming levels of the dimming glass can successively be 0, 0.0063, 0.029, 0.0707, 0.1332, 0.2176, 0.325, 0.4563, 0.6121, 0.7931 according to the above mentioned relationship between the human eye-sensed light transmittance and the actual light transmittance of the dimming glass. A dimming voltage corresponding to each of the dimming levels is then obtained according to the corresponding relationship between the actual light transmittance and the dimming voltages of the dimming glass.

FIG. 6 shows a diagram of corresponding relationships between dimming levels and dimming voltages, of the two implementations of this embodiment and of prior art.

At present, dimming glasses are usually installed in the exterior of such as houses, motor vehicles or aircrafts. For example, since light transmittance of dimming glasses will be influenced by temperature to a certain degree, when in use, the adjustment may be inaccurate if the actual light transmittance of the dimming glasses is only adjusted in accordance with one dimming voltage standard in the case where the dimming glasses are installed in an aircraft or a train which travels from Hainan to Harbin, or where the dimming glasses are installed in a house which goes through from summer to winter.

To address this issue, in a preferred implementation of this embodiment, obtaining the dimming voltage value corresponding to the light transmittance value according to the corresponding relationship between the actual light transmittance and the dimming voltages of the dimming glass includes:

obtaining an ambient temperature at which the dimming glass is exposed; and obtaining a dimming voltage value corresponding to the light transmittance value, according to a corresponding relationship between the actual light transmittance and the dimming voltages of the dimming glass at the ambient temperature.

Figure 7:
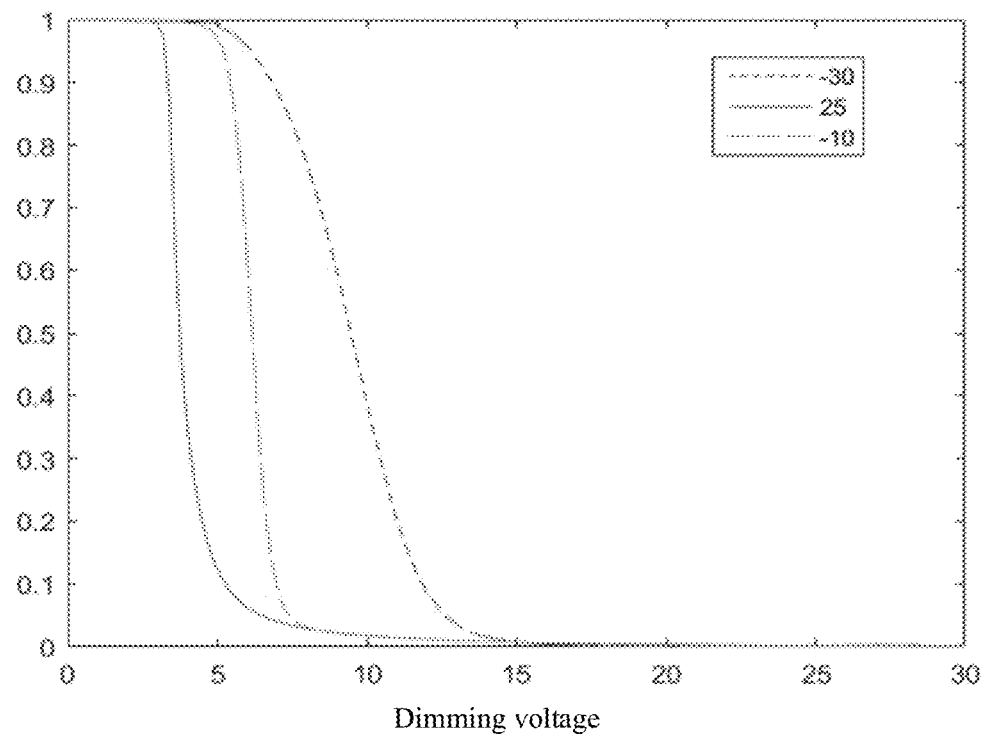
FIG. 7 shows a diagram of corresponding relationships between actual light transmittance and dimming voltages of a dimming glass at ambient temperatures respectively of −10° C., 25° C. and −30° C.

Specifically, in this embodiment, the corresponding relationship between the actual light transmittance and the dimming voltages of the dimming glass at different ambient temperatures can be for example as the graph shown in FIG. 7 (FIG. 7 shows corresponding relationships between the actual light transmittance and dimming voltages of a dimming glass respectively at ambient temperatures of −10° C., 25 ° C. and −30° C). . Therefore, when in use, depending on different ambient temperatures, the dimming voltage corresponding to the actual light transmittance of the dimming glass is obtained to further set different dimming levels, thus eliminating the influence of the ambient temperatures on the light transmittance of the dimming glass, and further improving the accuracy of dimming.

Figure 8:
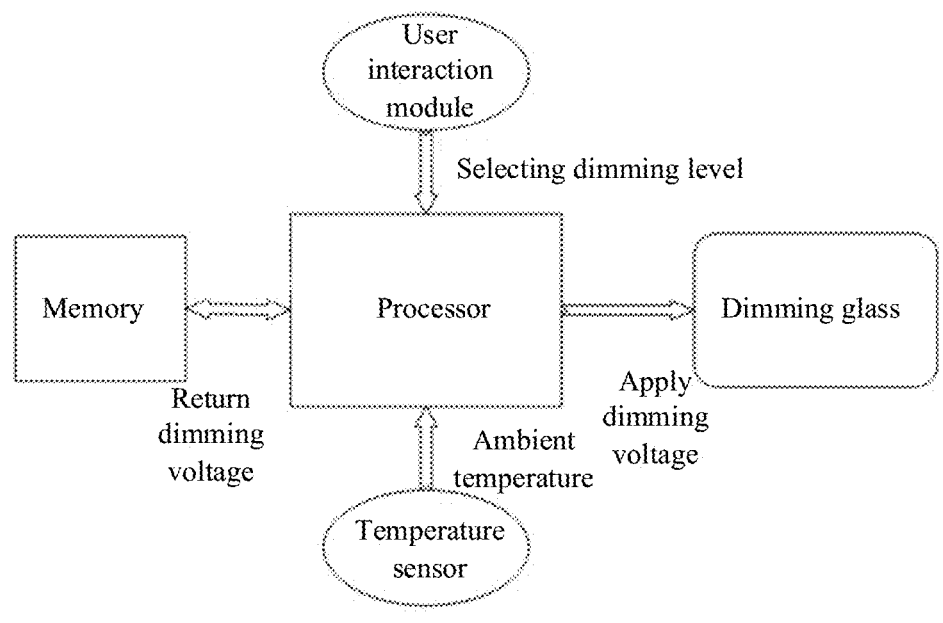
FIG. 8 shows a schematic diagram of a dimming device for a dimming glass proposed in another embodiment of the present disclosure.

Another embodiment of the present disclosure proposes a dimming device for a dimming glass. FIG. 8 shows a schematic diagram of a dimming device for a dimming glass proposed in another embodiment of the present disclosure. As shown in FIG. 8, the device includes:

a memory, configured to store a corresponding relationship between dimming levels and actual light transmittance of the dimming glass, and a corresponding relationship between the actual light transmittance and dimming voltages of the dimming glass;

a user interaction (UI) module; and a processor, configured to, in response to a dimming level selected from a user in the user interaction module, obtain a light transmittance value corresponding to the selected dimming level according to the corresponding relationship between the dimming levels and the actual light transmittance of the dimming glass, and obtain a dimming voltage value corresponding to the light transmittance value according to the corresponding relationship between the actual light transmittance and the dimming voltages of the dimming glass, so as to adjust a voltage applied to the dimming glass to the obtained dimming voltage value, wherein the corresponding relationship between the dimming levels and the actual light transmittance is:

dividing an adjustable range of the actual light transmittance of the dimming glass to obtain actual light transmittance corresponding to different dimming levels.

In an optional implementation of this embodiment, dividing the adjustable range of the actual light transmittance of the dimming glass to obtain the actual light transmittance corresponding to the different dimming levels includes:

obtaining the adjustable range of the actual light transmittance of the dimming glass; and dividing the adjustable range of the actual light transmittance of the dimming glass equally to obtain the actual light transmittance corresponding to the different dimming levels.

Specifically, in this embodiment, the user interaction module may be a UI interface displayed on a display. The user interaction module includes: a user interaction interface and a feedback module; wherein the user interaction interface is configured to receive a selection of a dimming level from a user, and the feedback module is configured to send the dimming level selected from the user to the processor. It is to be noted that in this embodiment, the processor and the temperature sensor may be integrated on a circuit board.

In other words, while using, the user can select a dimming level through the user interaction interface, and the feedback module will send the dimming level selected from the user to the processor. The processor may obtain a light transmittance value corresponding to the dimming level based on the input dimming level, and further obtain a dimming voltage value corresponding to the light transmittance value, so as to apply the dimming voltage to the dimming glass for corresponding adjustment of the light transmittance.

Further, the user interaction interface comprises:

a dimming level input box, configured to obtain the dimming level in response to a number entered from the user in the dimming level input box; or a plurality of separate dimming level buttons, configured to obtain the dimming level in response to clicks on the dimming level buttons from the user.

Specifically, the user interaction interface includes the following two display manners. The first one is the dimming level input box, wherein the user can input a number corresponding to a dimming level in the dimming level input box, so as to obtain the dimming level that the user wants to select. The second one is a plurality of separate dimming level buttons, wherein a plurality of dimming levels correspond to the plurality of separate dimming level buttons respectively, and when the user selects a desired dimming level, the user can obtain the desired dimming level by clicking the corresponding button.

Further, the user interaction interface includes a dimming level progress bar, configured to obtain the dimming level in response to dragging or dropping of the progress bar from the user.

In this embodiment, the user interaction interface may also include a display manner of the dimming level progress bar, wherein, when the user selects a desired dimming level, the user can obtain the corresponding dimming level by dragging or dropping the dimming level progress bar.

Figure 9:
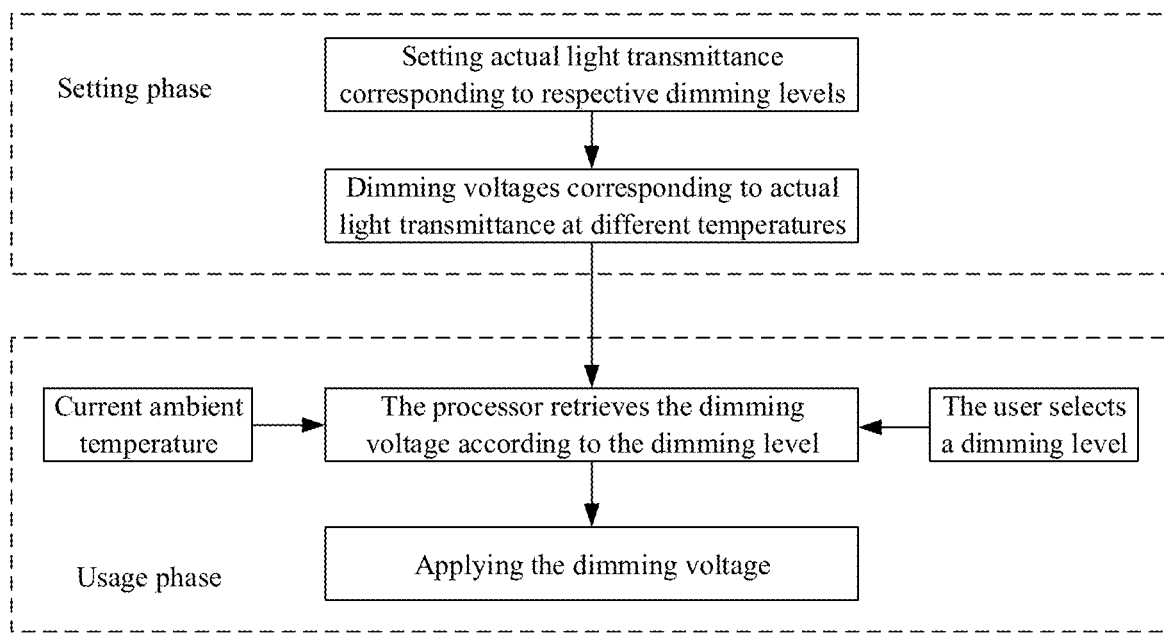
FIG. 9 shows a flow chart of a practical application of a dimming device in the embodiment.

FIG. 9 shows a flow chart of a practical application of a dimming device in the embodiment Hereinafter, this embodiment will be further introduced in conjunction with FIG. 9. At first, in a setting phase, the actual light transmittance corresponding to the respective dimming levels is set according to the corresponding relationship between the actual light transmittance of the dimming glass and the human eye-sensed light transmittance. Next, the dimming voltages corresponding to actual light transmittance at different ambient temperatures are measured in a laboratory, and the dimming voltages corresponding to the actual light transmittance at different ambient temperatures are stored in a storage module. In a usage phase, the user chooses a corresponding dimming level according to their needs. For example, if the user adjusts the dimming level of the dimming glass to 3. At this time, the processor obtains the selection from the user, and retrieves the dimming level of 3 at the current ambient temperature from the storage module with reference to a current temperature value input by the temperature sensor, and further obtains a dimming voltage corresponding to the dimming level of 3, and then applies the dimming voltage to the dimming glass for dimming.

The above-described embodiments of the present disclosure are only examples for clear illustration of the present disclosure, and not for limitation of the embodiments of the present disclosure. Other different forms of changes or variations can also be made by those of ordinary skill in the art on the basis of the foregoing description. It is not possible to exhaust all the embodiments here. Variations or changes belonging to the technical solutions of the present disclosure are still within the scope of protection of the present disclosure.

What is claimed is:

1. A dimming method for a dimming glass, comprising:
in response to a dimming level selected from a user,
obtaining a light transmittance value corresponding to the selected dimming level according to a corresponding relationship between dimming levels and actual light transmittance of the dimming glass;
obtaining a dimming voltage value corresponding to the light transmittance value according to a corresponding relationship between the actual light transmittance and dimming voltages of the dimming glass; and
adjusting a voltage applied to the dimming glass to the obtained dimming voltage value,
wherein the corresponding relationship between the dimming levels and the actual light transmittance of the dimming glass is dividing an adjustable range of the actual light transmittance of the dimming glass to obtain the actual light transmittance corresponding to different dimming levels; and
wherein dividing the adjustable range of the actual light transmittance of the dimming glass to obtain the actual light transmittance corresponding to different dimming levels comprises:
obtaining the adjustable range of the actual light transmittance of the dimming glass; and
dividing the adjustable range of the actual light transmittance of the dimming glass equally to obtain the actual light transmittance corresponding to the different dimming levels.

2. The dimming method according to claim 1, wherein obtaining the dimming voltage value corresponding to the light transmittance value according to the corresponding relationship between the actual light transmittance and the dimming voltages of the dimming glass comprises:
obtaining an ambient temperature at which the dimming glass is exposed; and
obtaining the dimming voltage value corresponding to the light transmittance value, according to a corresponding relationship between the actual light transmittance and the dimming voltages of the dimming glass at the ambient temperature.

3. A dimming device for a dimming glass, comprising:
a memory, configured to store a corresponding relationship between dimming levels and actual light transmittance of the dimming glass and a corresponding relationship between the actual light transmittance and dimming voltages of the dimming glass;
a user interaction module; and
a processor, configured to, in response to a dimming level selected from a user in the user interaction module, obtain a light transmittance value corresponding to the selected dimming level according to the corresponding relationship between the dimming levels and the actual light transmittance of the dimming glass, and obtain a dimming voltage value corresponding to the light transmittance value according to the corresponding relationship between the actual light transmittance and the dimming voltage of the dimming glass, so as to adjust a voltage applied to the dimming glass to the obtained dimming voltage value,
wherein the corresponding relationship between the dimming levels and the actual light transmittance is dividing an adjustable range of the actual light transmittance of the dimming glass to obtain the actual light transmittance corresponding to different dimming levels; and
wherein dividing the adjustable range of the actual light transmittance of the dimming glass to obtain the actual light transmittance corresponding to different dimming levels comprises:
obtaining the adjustable range of the actual light transmittance of the dimming glass; and
dividing the adjustable range of the actual light transmittance of the dimming glass equally to obtain the actual light transmittance corresponding to the different dimming levels.

4. The dimming device according to claim 3, further comprising:
a temperature sensor, configured to sense an ambient temperature at which the dimming glass is exposed,
wherein the memory is further configured to store a corresponding relationship between the actual light transmittance and the dimming voltages of the dimming glass at different ambient temperatures; and
the processor is further configured to obtain the dimming voltage value corresponding to the light transmittance value according to the stored corresponding relationship between the actual light transmittance and the dimming voltages of the dimming glass at the ambient temperature, so as to adjust a voltage applied to the dimming glass to the obtained dimming voltage value.

5. The dimming device according to claim 3, wherein the user interaction module comprises:
a user interaction interface and a feedback module,
wherein the user interaction interface is configured to receive a selection of a dimming level from a user, and the feedback module is configured to send the dimming level selected from the user to the processor.

6. The dimming device according to claim 5, wherein the user interaction interface comprises:
a dimming level input box, configured to obtain the dimming level in response to a number entered from the user in the dimming level input box; or
a plurality of separate dimming level buttons, configured to obtain the dimming level in response to clicks on the dimming level buttons from the user.

7. The dimming device according to claim 5, wherein the user interaction interface comprises a dimming level progress bar, configured to obtain the dimming level in response to dragging or dropping of the dimming level progress bar from the user.

8. The dimming device according to claim 4, wherein the processor and the temperature sensor are integrated on a circuit board.

9. A dimming glass system, comprising:
a dimming glass; and
the dimming device according to claim 3.

10. A dimming method for a dimming glass, comprising:
in response to a dimming level selected from a user, obtaining a light transmittance value corresponding to the selected dimming level according to a corresponding relationship between dimming levels and actual light transmittance of the dimming glass;
obtaining a dimming voltage value corresponding to the light transmittance value according to a corresponding relationship between the actual light transmittance and dimming voltages of the dimming glass; and
adjusting a voltage applied to the dimming glass to the obtained dimming voltage value,
wherein the corresponding relationship between the dimming levels and the actual light transmittance of the dimming glass is dividing an adjustable range of the actual light transmittance of the dimming glass to obtain the actual light transmittance corresponding to different dimming levels; and
wherein dividing the adjustable range of the actual light transmittance of the dimming glass to obtain the actual light transmittance corresponding to different dimming levels comprises:
obtaining the adjustable range of the actual light transmittance of the dimming glass;
obtaining an adjustable range of human eye-sensed light transmittance corresponding to the adjustable range of the actual light transmittance of the dimming glass, according to a corresponding relationship between the actual light transmittance of the dimming glass and the human eye-sensed light transmittance;
dividing the adjustable range of the human eye-sensed light transmittance equally to obtain the human eye-sensed light transmittance corresponding to different dimming levels; and
obtaining the actual light transmittance corresponding to the different dimming levels according to the human eye-sensed light transmittance corresponding to the different dimming levels.

11. The dimming method according to claim 10, wherein the corresponding relationship between the actual light transmittance of the dimming glass and the human eye-sensed light transmittance is obtained by the following equation:

$$T_{sense} = T_{real}^{\left(\frac{1}{gamma}\right)},$$

wherein $T_{sense}$ is the human eye-sensed light transmittance, $T_{real}$ is the actual light transmittance of the dimming glass, and gamma is a gamma value.

12. The dimming method according to claim 11, wherein the gamma value is 2.2.

13. The dimming method according to claim 10, wherein obtaining the dimming voltage value corresponding to the light transmittance value according to the corresponding relationship between the actual light transmittance and the dimming voltages of the dimming glass comprises:
obtaining an ambient temperature at which the dimming glass is exposed; and
obtaining the dimming voltage value corresponding to the light transmittance value, according to a corresponding relationship between the actual light transmittance and the dimming voltages of the dimming glass at the ambient temperature.

* * * * *